Aug. 13, 1963  S. S. OSDER  3,100,861
FAIL-SAFE CONTROL SYSTEMS FOR AIRCRAFT
Filed Dec. 23, 1960
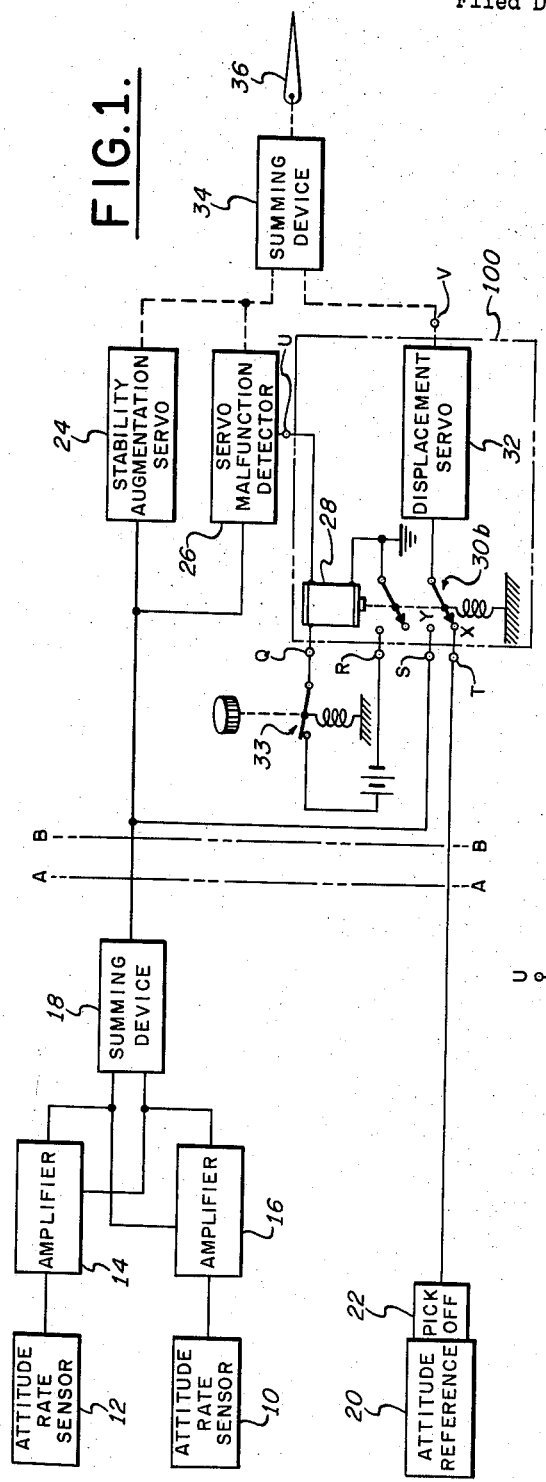
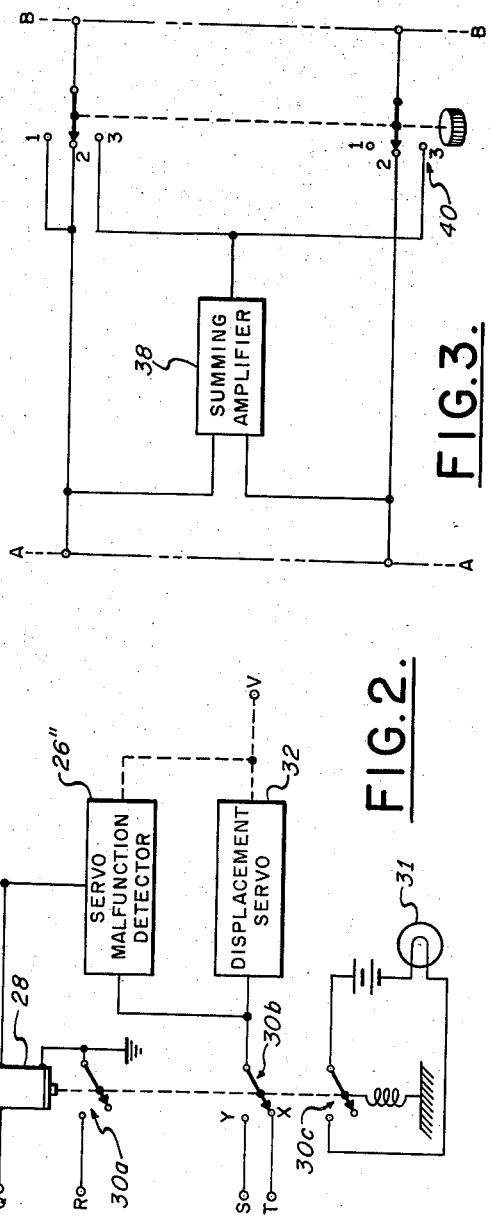
INVENTOR.
STEPHEN S. OSDER
BY
ATTORNEY United States Patent Office 3,100,861
Patented Aug. 13, 1963

3,100,861
FAIL-SAFE CONTROL SYSTEMS FOR AIRCRAFT
Stephen S. Osder, Phoenix, Ariz., assignor to Sperry Rand Corporation, Great Neck, N.Y., a corporation of Delaware
Filed Dec. 23, 1960, Ser. No. 77,939
8 Claims. (Cl. 318—489)

The present invention relates generally to control systems for aircraft and more particularly to fail-safe automatic flight control systems.

Ordinarily, in a system for controlling the movement of a craft about one of its axes, signals are provided which represent both the displacement of the craft from a reference attitude and the rate that the craft changes its attitude; these signals are added algebraically to produce a sum signal which is applied to a servo, the servo being operable with a control surface on the craft to cause the craft to assume the reference attitude.

As presently practiced, there are two general ways in which the above-described flight control system may be made fail-safe: In the first of these ways, the above-mentioned sum signal is applied to two separate channels, each of which has a servo. One of the servos receives the sum signal directly and, when operating properly, moves the control surface. The second servo, on the other hand, is normally inoperative and becomes operative only when the first servo fails to operate. When operating, the second servo, likewise, moves the control surface. As is readily apparent, the above-described fail-safe technique, to its disadvantage, does not make full use of all of its components, i.e. it maintains a fully operative servo in a standby, non-operating condition as long as the other servo operates properly. In the second of the above-mentioned fail-safe techniques, the sum signal is applied simultaneously to two servos, each of which has its gain so disposed that it contributes half of the force necessary to move the control surface. The outputs of the two servos are then summed by a differential linkage which moves the control surface. In the event one of the servos fails, automatic control is provided by the operating servo; however, since one-half of the force required to move the control surface is lost when one of the servos fails, the automatic control provided by the operating servo is only sufficient enough to prevent dangerous craft maneuvers. To increase the automatic control provided by the single operating servo, its gain may be increased; however, this too has undesirable aspects. For example, since each servo is designed to have optimum performance when it has a certain level of gain, any change in gain from that level deteriorates the performance of the servo.

The apparatus of the present invention overcomes the attendant disadvantages of the prior art by employing two normally operating servos which, together or singly, properly control the flight of the craft and which, also, never require modification in any form. Generally, the apparatus of the present invention applies the signal representing the craft displacement from a reference attitude to one servo and the signal representing the craft rate of change of attitude to a different servo, this technique being in contrast to the prior art application of these signals to a summing device. The outputs of the two servos are then summed by a differential linkage which moves the control surface. A servo malfunction detector, operable with the servo adapted to receive the attitude rate signal, hereinafter called the stability augmentation servo, operates to detect failures in that servo and, when a failure is detected, operates to remove the displacement signal from the other servo, hereinafter called the displacement servo, and to apply to the displacement servo, instead, the attitude rate signal. Since the attitude rate signal is representative of the rate that the craft departs from its reference attitude, it is essential to the prevention of dangerously rapid departures from the reference attitude. It is for this reason that the attitude rate signal is preferentially handled, as described above, and applied always to either one or the other of the servos. Under normal operation with both the stability augmentation servo and the displacement servo operating properly, the control surface is moved, as before, in response to the sum of the displacement and attitude rate signals. In the event that the displacement servo fails to operate, the stability augmentation servo will operate to prevent dangerously rapid departures of the craft from its reference attitude. However, in the event the stability augmentation servo fails to operate, the servo malfunction detector will respond immediately to apply the attitude rate signal to the displacement servo, thereby as mentioned above, preventing dangerously rapid departures of the craft from its reference attitude.

By providing separate servos to which the displacement and attitude rate signals are applied respectively, the apparatus of the present invention, as will be described later, is adaptable readily to the following modes of operation: a semiautomatic flight control mode in which short term attitude corrections are automatically provided and long term attitude corrections are provided by manipulation of the craft control stick; an automatic flight control mode as described above; and a standby automatic flight control mode.

A principal object of the invention is to provide an automatic flight control system having fail-safe features.

Another object of the invention is to provide a flight control system wherein separate servos are provided for the displacement and attitude rate signals, and wherein the attitude rate signal is preferentially handled.

Still another object of the invention is to provide a flight control system having normal automatic, standby automatic, and semiautomatic modes of operation.

The invention will be described with reference to the figures wherein:

FIG. 1 is a block diagram of apparatus embodying the present invention,

FIG. 2 is a schematic diagram of a circuit adapted to provide a specie of the invention, and FIG. 3 is a schematic diagram of a circuit which, when employed with the apparatus of FIG. 1, provides that apparatus with several modes of operation.

Referring to FIG. 1, a flight control system, e.g. a system for controlling the pitch attitude of a craft, has a pair of sensors 10 and 12, each of which produces a signal representing the rate that the craft changes its pitch attitude. The attitude rate sensors 10 and 12 are, as presently preferred, integrating accelerometers which apply their output signals respectively to amplifiers 14 and 16. The amplifiers 14 and 16 apply their output signals to a summing device 18 which operates to produce a composite attitude rate signal. The output signal from the amplifier 14 is also applied as a bias to the amplifier 16; likewise, the amplifier 16 applies its output signal as a bias to the the amplifier 14. As a result of this mutual biasing of the amplifiers, the output signal from the summing device 18 always represents the rate that the craft changes its attitude. For example, in the event that the signal at the output of the amplifier 14 has a magnitude less than that which properly represents the rate that the craft is changing its attitude, the bias applied to the amplifier 16 will be reduced correspondingly, hereby causing: (1) the amplifier 16 output signal to have an enhanced magnitude, and (2) the summing device 18 output signal to be unaffected by changes in the output signals from the amplifiers 14 and 16. The above-described technique for assuring that the summing device 18 output signal always represents the rate that the craft changes its attitude is utilized because the attitude rate signal is considered essential to the stable control of the craft. See U.S. Patent 2,824,296, filed in the names of H. Hecht and C. Pottle and assigned to the assignee of this invention, for a disclosure of apparatus employing the above-described mutual biasing technique. It is to be realized that, while only two attitude rate sensors are shown in FIG. 1, any number of sensors may be combined by mere multiplication of the apparatus set forth. An attitude reference 20, e.g. a vertical gyro, has a pick-off 22 which provides a signal representing the displacement of the craft from a reference pitch attitude. The summing device 18 output signal is applied to a stability augmentation servo 24 and to a servo malfunction detector 26 which receives, also, a signal representing the output of the servo 24. So long as the input signal to the stability augmentation servo 24 and the signal representing the servo 24 output are identical, the servo malfunction detector 26 has no output signal. However, when the servo 24 fails to respond properly to its input signal, a discrepancy occurs between the servo input signal and the signal representing the servo output, thereby causing the servo malfunction detector 26 to apply an output signal to a self-holding relay 28 which energizes that relay. See U.S. Patent 2,823,877, issued in the name of John J. Hess and assigned to the assignee of this invention, for a disclosure of the above-described servo malfunction detecting scheme. The self-holding relay 28, when energized, moves the switches 30A and 30B from their normal down posiitons to their up positions. When the switch 30A moves to its up position it closes a circuit which keeps the relay 28 energized. A normally closed switch 33 is provided in the relay circuit and, when opened momentarily, de-energizes the relay. When the switch 30B is in its down position, i.e. in contact with terminal X, the pick-off 22 output signal representing the craft displacement from its reference attitude is applied to a displacement servo 32. When the switch 30B moves to its up position, i.e. in contact with terminal Y, the composite attitude rate signal, instead of the displacement signal, is applied to the displacement servo 32. The servos 24 and 32 are connected to a mechanical summing device 34, e.g. one of the devices disclosed in Radiation Laboratory Series, vol. 27, McGraw-Hill Book Co., Inc., 1948, Sec. 1-4, the output of which is connected to and operates to move the control surface 36.

In operation, with both the stability augmentation servo 24 and the displacement servo 32 operating properly, a momentary departure of the craft from its reference attitude causes the pick-off 22 to apply a displacement signal to the displacement servo 32. In addition, such departure causes a signal representing the rate that the craft attitude changes to be applied, by the summing device 18, to the stability augmentation servo 24. If the craft rate of change of attitude is small, the stability augmentation servo 24 is essentially inactive; however, if the craft rate of change of attitude is great, the stability augmentation provides most of the force necessary to move the control surface 36. The servos 24 and 26 have their outputs combined by the summing device 34 which operates the control surface 36 to cause the craft to assume its reference attitude. In the event that the displacement servo 32 becomes unresponsive to craft displacements from its reference attitude, the stability augmentation servo 24 will operate to move the control surface 36 satisfactorily. This will be especially so when the craft changes its attitude rapidly, i.e. when the attitude of the craft is changed dangerously. Since the attitude rate signal alone is sufficient to control the flight of the craft satisfactorily, it is preferentially handled. That is, in the event the stability augmentation servo 24 itself fails to operate, the servo malfunction detector 26 operates to energize the relay 28 and to apply the attitude rate signal (instead of the displacement signal) to the displacement servo 32, thereby continuing the safe control of the craft.

Referring to FIG. 2, a circuit adapted to replace the circuit enclosed within the dashed lines 100 of FIG. 1 provides a warning to the pilot when there is a failure in the flight control system. The displacement servo 32, like the stability augmentation servo 24, is provided with a servo malfunction detector 26' which is identical to the detector 26. The output signal from the servo malfunction detector 26' is applied to the relay 28 along with the output signal from the detector 26 so that the relay 28 can be energized by either detector. A third switch 30C, in addition to the switches 30A and 30B, is moved to its up position when the relay 28 is energized. The switch 30C, when moved to its up position, lights a lamp 31 to indicate that either (or both) the servos 24 or the servo 32 is malfunctioning.

Because the displacement and attitude rate signals are applied to separate servos, the apparatus of FIG. 1 is readily adapted to provide several modes of operation simply by connecting the apparatus of FIG. 3 to the apparatus of FIG. 1 as indicated by the dashed lines A—A and B—B of FIG. 1. Referring to FIG. 3, the summing amplifier 38 receives the attitude rate and displacement signals. A two-pole three-position switch 40 applies the attitude rate signal to the stability augmentation servo 24 and no signal to the displacement servo 32 when the switch is in position "1." In position "2," the switch applies the attitude rate signal and the displacement signal respectively to the stability augmentation servo 24 and the displacement servo 32. In position "3," the switch applies a signal representing the sum of the displacement signal and the attitude rate signal to each of the servos 24 and 32. With the switch 40 in position "1," the stability augmentation servo 24 operates as though the displacement servo 32 were inoperative and prevents sudden and rapid craft attitude changes. However, since the stability augmentation servo 24 is essentially unresponsive to long term attitude changes, the pilot, by means of his control stick, will have to correct for long term, i.e. safe, changes in the craft attitude, thereby making the flight control system semi-automatic when the switch 40 is in position "1." With the switch 40 in position "2," the apparatus operates the same as the apparatus of FIG. 1 and is fully automatic in nature. With the switch 40 in position "3," a standby automatic mode of operation is provided. With the equipment, for example, being operated in its normal automatic mode, i.e. switch 40 in position "2," a failure of either servo 24 or servo 32 causes an immediate change to a safe, but semi-automatic, mode of operation. To restore the equipment to a fully automatic mode of operation, the switch 40 may be moved to position "3." With the switch 40 in position "3," and with one of the servos inoperative, the system operates like the above-described flight control system having no fail-safe features. That is, the control surface 36 is moved by a single servo operating in response to a signal representing the sum of the craft displacement from a reference attitude and the rate that the craft changes its attitude.

In addition to providing semi-automatic, normal automatic, and standby automatic modes of operation, the switch 40 also provides an augmented fully automatic flight control system if both the stability augmentation servo 24 and the displacement servo 32 are operative. For example, in the event that either, or both, the attitude reference pick-off 22 or the summing device 18 provide attenuated output signals, the flight control system will respond sluggishly to control the craft. Under these circumstances, the switch 40 may be placed in position "3" so that both servos 24 and 32 operate in response to the same signal, thereby causing the summing device 34 to have twice the output that it would have with the switch 40 in position "2."

While the invention has been described in its preferred embodiments, it is to be understood that the words which

What is claimed is:

1. Apparatus for controlling the attitude of an aircraft comprising means producing a signal representing the craft displacement from a reference attitude, means producing a signal representing the rate that said craft changes its attitude, first and second servo means adapted to receive respectively said displacement and attitude rate signals, means connected to both said servo means responsive to vary a control member on said craft in accordance with the sum of the respective outputs of said servo means, and means responsive to malfunctions of said second servo means to apply said attitude rate signal to said first servo means instead of said displacement signal.

2. A control system for use with a dirigible craft comprising means producing a signal representing the displacement of said craft from a reference attitude, means producing a signal representing the craft rate of change of displacement from said reference attitude, switching means, first and second servo means, said second servo means being adapted to receive the signal representing the craft rate of change of displacement and said first servo means being adapted to receive the displacement signal through said switching means, means responsive to malfunctions in said second servo means to operate said switching means and apply said displacement rate signal to said first servo means instead of said displacement signal, and means coupled to said first and second servo means to operate a control member on said craft in proportion to the sum of the respective outputs of said servo means.

3. Automatic pilot apparatus for dirigible craft comprising means producing a signal representing the craft displacement from a reference attitude, means to produce a signal representing the rate that said craft changes its attitude, first servo means responsive solely to said displacement rate signal, relay means, second servo means, means responsive to malfunctions in said first servo means to disable said first servo means and operate said relay means, said relay means applying either said displacement rate signal or said displacement signal to said second servo means when said relay means is respectively operated or not operated, and means operable with a control element on said craft summing the respective outputs of said first and second servo means.

4. Apparatus for controlling the attitude of an aircraft comprising means producing a signal representing the craft displacement from a reference attitude, means producng a signal representing the rate that said craft changes its attitude, said means producing a signal representing the rate of change of attitude comprising a multiplicity of means sensing the rate of change of attitude, a multiplicity of amplifiers each of which is operable respectively with a sensing means, summing means adapted to receive the output signals from each of said amplifiers producing a composite attitude rate signal, and means responsive when one of said amplifiers fails to have an output signal to increase proportionately the gain of said other amplifiers, thereby preventing the composite signal from being affected by the failure of amplifiers and sensing means, first and second servo means adapted to receive respectively said displacement and composite signals, means connected to both said servo means responsive to vary a control member on said craft in accordance with the sum of the respective outputs of said servo means, and means responsive to malfunctions of said second servo means to apply said composite signal to said first servo means instead of said displacement signal.

5. A control system for use with a dirigible craft comprising means producing a signal representing the displacement of said craft from a reference attitude, means producing a signal representing the craft rate of change of displacement from said reference attitude, summing means receiving said displacement and displacement rate signals producing a signal representing their algebraic sum, first servo means, second servo means, switching means for selectively applying said displacement rate signal to said first servo means and no signal to said second servo means, or said displacement rate signal and said displacement signal respectively to said first and second servo means, or said sum signal to each of said servo means, and means connected to said first and second servo means to operate a control member on said craft in proportion to the algebraic sum of the outputs of said first and second servo means.

6. A control system for use with a dirigible craft comprising means producing a signal representing the displacement of said craft from a reference attitude, means producing a signal representing the craft rate of change of displacement from said reference attitude, summing means receiving said displacement and displacement rate signals producing a signal representing their algebraic sum, first servo means, second servo means, switching means for selectively applying said displacement rate signal to said first servo means and no signal to said second servo means, or said displacement rate signal and said displacement signal respectively to said first and second servo means, or said sum signal to each of said servo means, means connected to said first and second servo means to operate a control member on said craft in proportion to the algebraic sum of the outputs of said first and second servo means, and means responsive to failures in said first servo means to remove the signal being applied to said second servo means and apply thereto instead the signal being applied to said first servo means.

7. A control system for use with a dirigible craft comprising means producing a signal representing the displacement of said craft from a reference attitude, means producing a signal representing the craft rate of change of displacement from said reference attitude, said means producing a signal representing the rate of change of displacement comprising a multiplicity of means sensing the rate of change of displacement, a multiplicity of amplifiers each of which is operable respectively with a sensing means, summing means adapted to receive the output signals from each of said amplifiers producing a composite displacement rate signal, and means responsive when one of said amplifiers fails to have an output signal to increase proportionately the gain of said other amplifiers, thereby preventing the composite signal from being affected by the failure of amplifiers and sensing means, summing means receiving said displacement and composite displacement rate signals producing a signal representing their algebraic sum, first servo means, second servo means, switching means for selectively applying said composite displacement rate signal to said first servo means and no signal to said second servo means, or said composite displacement rate signal and said displacement signal respectively to said first and second servo means, or said sum signal to each of said servo means, means connected to said first and second servo means to operate a control member on said craft in proportion to the algebraic sum of the outputs of said first and second servo means, and means responsive to failures in said first servo means to remove the signal being applied to said second servo means and apply thereto instead the signal being applied to said first servo means.

8. A control system for use with a dirigible craft comprising means producing a signal representing the displacement of said craft from a reference attitude, means producing a signal representing the craft rate of change of displacement from said reference attitude, summing means receiving said displacement and displacement rate signals producing a signal representing their algebraic sum, first servo means, second servo means, switching means for selectively applying said displacement rate signal to said first servo means and no signal to said second servo means, or said displacement rate signal and said displacement signal respectively to said first and second servo means, or said sum signal to each of said servo means, means connected to said first and second servo means to operate a control member on said craft in proportion to the algebraic sum of the outputs of said first and second servo means, and means comparing the input signal to said first servo means with a signal representing the output of said first servo means responsive when there is a difference therebetween to remove the signal being applied to said second servo means and apply thereto instead the signal being applied to said first servo means.

References Cited in the file of this patent
UNITED STATES PATENTS

| | | |
|---|---|---|
| 2,642,554 | MacCallum | June 16, 1953 |
| 2,665,086 | Moog et al. | Jan. 5, 1954 |
| 2,820,935 | Kleason | Jan. 21, 1958 |
| 2,835,861 | Eckhardt | May 20, 1958 |
| 2,862,167 | Curry | Nov. 25, 1958 |